(12) United States Patent
Jakobuco (10) Patent No.: US 12,471,722 B2
(45) Date of Patent: Nov. 18, 2025

(54) SUCTION CUP HOLDER

(71) Applicant: Christophe Jakobuco, Guangzhou (CN)

(72) Inventor: Christophe Jakobuco, Guangzhou (CN)

( * ) Notice: Subject to any disclaimer, the term of this patent is extended or adjusted under 35 U.S.C. 154(b) by 0 days.

(21) Appl. No.: 18/785,154

(22) Filed: Jul. 26, 2024

(65) Prior Publication Data

US 2024/0382020 A1     Nov. 21, 2024

(30) Foreign Application Priority Data

Jun. 24, 2024  (CN) .................. 202421444905.3

(51) Int. Cl.

| A47G 1/17 | (2006.01) |
|---|---|
| F16B 47/00 | (2006.01) |
| F16M 11/04 | (2006.01) |
| F16M 13/02 | (2006.01) |
| H01F 7/02 | (2006.01) |
| H04M 1/04 | (2006.01) |

(52) U.S. Cl.
CPC ................ A47G 1/17 (2013.01); F16B 47/00 (2013.01); F16M 11/041 (2013.01); F16M 13/022 (2013.01); H01F 7/0252 (2013.01); H04M 1/04 (2013.01)

(58) Field of Classification Search
CPC ......... A47G 1/17; F16B 47/00; F16M 11/041; F16M 13/022; H01F 7/0252; H04M 1/04
USPC ...................................................... 248/205.5
See application file for complete search history.

(56) References Cited

U.S. PATENT DOCUMENTS

| 3,101,566 | A | * | 8/1963 | Stiller ................ | A47K 5/04 |
|---|---|---|---|---|---|
| | | | | | 248/205.5 |
| 4,328,942 | A | * | 5/1982 | Birnbaum ............ | F16M 13/00 |
| | | | | | 248/362 |
| 6,164,976 | A | * | 12/2000 | Wilson .............. | B43L 21/04 |
| | | | | | 434/408 |
| 8,950,715 | B2 | * | 2/2015 | Chiu ................ | F16M 13/022 |
| | | | | | 248/205.8 |
| 9,723,910 | B2 | * | 8/2017 | Due ................. | A45F 5/10 |
| 10,419,054 | B1 | * | 9/2019 | VanTassell ............ | H04M 1/04 |
| 10,581,480 | B1 | * | 3/2020 | Kim ................ | H04B 1/3888 |
| 10,703,297 | B1 | * | 7/2020 | Cohen ................ | B60N 3/103 |
| 11,265,035 | B1 | * | 3/2022 | Zhang ................ | F16M 11/105 |

(Continued)

FOREIGN PATENT DOCUMENTS

| CN | 114051065 | A | * | 2/2022 | ............. H04M 1/04 |
|---|---|---|---|---|---|
| CN | 221151747 | U | * | 6/2024 | ........... A45C 11/002 |

(Continued)

*Primary Examiner* — Taylor Morris
(74) *Attorney, Agent, or Firm* — Zhigang Ma (57) ABSTRACT

The present disclosure discloses a suction cup holder, and relates to the technical field of mobile phone holders. The suction cup holder includes a fixed seat and a magnetic suction seat; several suction cups are fixed on a bottom surface of the fixed seat; the fixed seat is circular; a first circular groove is provided on a top surface of the fixed seat; a mirror is fixed in the first circular groove; the magnetic suction seat is annular; the magnetic suction seat and the fixed seat are rotatably connected; the magnetic suction seat can sleeve the fixed seat; an annular groove is provided on the magnetic suction seat; an opening of the annular groove faces away from the suction cups; and an annular magnet is fixed in the annular groove.

9 Claims, 6 Drawing Sheets

(56) References Cited

U.S. PATENT DOCUMENTS

| | | | |
|---|---|---|---|
| 11,563,838 B1* | 1/2023 | Sham | H04M 1/0202 |
| 11,796,128 B1* | 10/2023 | Ma | F16M 11/041 |
| 11,940,090 B1* | 3/2024 | Sumida | F16M 13/04 |
| 12,031,669 B2* | 7/2024 | Whitten | A45F 5/10 |
| 12,207,716 B1* | 1/2025 | Li | A45C 13/007 |
| 2011/0127392 A1* | 6/2011 | Carter | F16M 11/38 |
| | | | 248/419 |
| 2012/0145843 A1* | 6/2012 | Ho | F16M 11/041 |
| | | | 248/176.3 |
| 2014/0200081 A1* | 7/2014 | Ying | A63F 13/2145 |
| | | | 463/37 |
| 2017/0302322 A1* | 10/2017 | Harris | F16M 11/2021 |
| 2018/0220782 A1* | 8/2018 | Mody | A45F 5/00 |
| 2018/0359346 A1* | 12/2018 | Chen | F16M 13/04 |
| 2019/0195417 A1* | 6/2019 | Kwasniewski | F16M 11/2064 |
| 2020/0127694 A1* | 4/2020 | Lim | H04B 1/385 |
| 2020/0235770 A1* | 7/2020 | Yim | H04B 1/3877 |
| 2020/0292128 A1 | 9/2020 | Ahi | |
| 2020/0329133 A1* | 10/2020 | Surani | H04M 1/04 |
| 2021/0088181 A1 | 3/2021 | Ahi | |
| 2021/0140583 A1 | 5/2021 | Ahi | |
| 2021/0301976 A1* | 9/2021 | Cohen | H04M 1/04 |
| 2021/0353051 A1* | 11/2021 | Phifer | F16M 11/2021 |
| 2022/0094379 A1* | 3/2022 | Balderston | H04B 1/3877 |
| 2022/0228709 A1* | 7/2022 | Chao | F16M 11/40 |
| 2022/0378205 A1* | 12/2022 | Cheney | F16M 11/041 |
| 2023/0228290 A1* | 7/2023 | Hughes | F16M 11/041 |
| | | | 455/575.8 |
| 2023/0328164 A1* | 10/2023 | Kang | F16M 13/022 |
| 2023/0403352 A1* | 12/2023 | Alves | B65D 1/0207 |
| 2023/0412715 A1* | 12/2023 | Marks | H04B 1/3877 |
| 2024/0053840 A1* | 2/2024 | Barnett | G06F 3/0362 |
| 2024/0380427 A1* | 11/2024 | Dose | H04B 1/3877 |

FOREIGN PATENT DOCUMENTS

| | | | | |
|---|---|---|---|---|
| DE | 102017104068 A1 * | 8/2018 | | F16B 47/00 |
| DE | 202018003238 U1 * | 8/2018 | | F16B 47/00 |
| DE | 202020004047 U1 * | 11/2020 | | A45C 11/002 |
| FR | 3049835 A1 * | 10/2017 | | F16M 11/041 |
| GB | 2503749 A * | 1/2014 | | G06F 1/1632 |
| TW | 202419016 A * | 5/2024 | | |
| TW | 202526567 A * | 7/2025 | | |
| WO | WO-2006005761 A1 * | 1/2006 | | F16B 47/00 |
| WO | WO-2014080159 A1 * | 5/2014 | | F16M 13/022 |

* cited by examiner

SUCTION CUP HOLDER

TECHNICAL FIELD

The present disclosure relates to the technical field of mobile phone holders, and in particular, to a suction cup holder.

BACKGROUND

At present, there are various types of suction cup holders on the market. For example, Chinese patent CN207207935U discloses a suction cup type in-vehicle mobile phone holder, which is fixed by a suction cup and a magnet. A rotating shaft is used to rotate relative to a base, with high suction capability. However, due to the independent arrangement of the base, the rotating shaft, and the suction cup of the holder in a height direction, there is no overlap between the components, so the holder has a large volume and is not easy to carry around.

SUMMARY

For the defects in the prior art, the present disclosure aims to provide a suction cup holder, which solves the problem of a large volume of a suction cup holder.

The objective of the present disclosure is achieved by the following technical solutions:

A suction cup holder includes a fixed seat and a magnetic suction seat; several suction cups are fixed on a bottom surface of the fixed seat; the fixed seat is circular; a first circular groove is provided on a top surface of the fixed seat; a mirror is fixed in the first circular groove; the magnetic suction seat is annular; the magnetic suction seat and the fixed seat are rotatably connected; the magnetic suction seat sleeves the fixed seat; an annular groove is provided on the magnetic suction seat; an opening of the annular groove faces away from the suction cups; and an annular magnet is fixed in the annular groove.

Further, a second circular groove is provided on the bottom surface of the fixed seat; the plurality of suction cups are fixed on a same circular silica gel seat; and the silica gel seat is fixed in the second circular groove.

Further, one of the suction cups is arranged in a center of the silica gel seat, and the remaining suction cups are annularly arranged along the silica gel seat.

Further, the suction cup holder includes a rotating shaft; a shaft hole is provided on the fixed seat; a mounting hole is provided on the magnetic suction seat; the rotating shaft is arranged in the shaft hole; two ends of the rotating shaft extend out of the shaft hole and are inserted into the mounting hole; the rotating shaft is fixed in the shaft hole and rotates in the mounting hole, or the rotating shaft is fixed in the mounting hole and rotates in the shaft hole.

Further, the rotating shaft includes two flower pins; the two flower pins are respectively inserted into two ends of the shaft hole and extend out of the two ends of the shaft hole; portions of the flower pins inserted into the shaft hole are sleeved with rubber tube sleeves; a fixing hole is provided on the magnetic suction seat; and portions of the flower pins extending out of the shaft hole are rotatably arranged in the mounting hole.

Further, the fixed seat extends to form a rotating portion; the rotating portion and the fixed seat are integrally formed; the shaft hole is provided on the rotating portion; the magnetic suction seat is an opened annular shape; and the rotating portion is arranged at an opening position of the magnetic suction seat.

Further, the fixed seat extends to form a toggle piece; the toggle piece and the fixed seat are integrally formed; and a groove configured to accommodate the toggle piece is provided on the magnetic suction seat.

Further, an annular decorative sheet is fixed on the magnetic suction seat, and the decorative sheet is arranged at an opening position of the annular groove and covers the annular magnet.

Further, a mirror surface of the mirror faces the top surface of the fixed seat.

Beneficial effects of the present disclosure are as follows:

In the present disclosure, the magnetic suction seat sleeves an outer ring of the fixed seat, so that the suction cup holder has a small volume and is convenient to store and carry. Meanwhile, the magnetic suction seat and the fixed seat can rotate each other, so that an angle between two fixed positions of the suction cup holder is adjustable, and the range of applications is wide.

In the drawings: 1: fixed seat; 2: magnetic suction seat; 3: suction cup; 4: first circular groove; 5: mirror; 6: annular groove; 7: annular magnet; 8: second circular groove; 9: silica gel seat; 10: rotating shaft; 11: flower pin; 12: rubber tube sleeve; 13: shaft hole; 14: mounting hole; 15: rotating portion; 16: toggle piece; 17: groove; and 18: decorative sheet.

DETAILED DESCRIPTION OF THE EMBODIMENTS

In order to make the technical problems to be solved, technical solutions, and beneficial effects of the present disclosure clearer, the following is a further detailed explanation of the present disclosure in conjunction with the accompanying drawings and embodiments.

Figure 1:
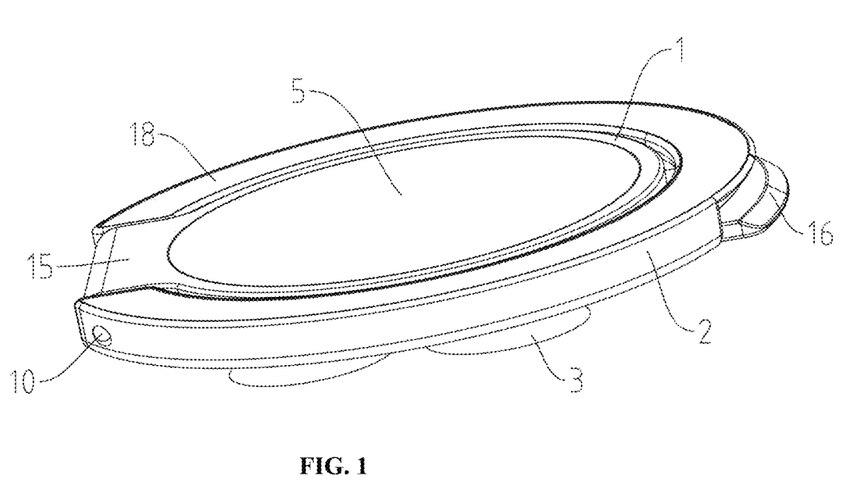
FIG. 1 is a three-dimensional diagram of a suction cup holder of the present disclosure.
Figure 2:
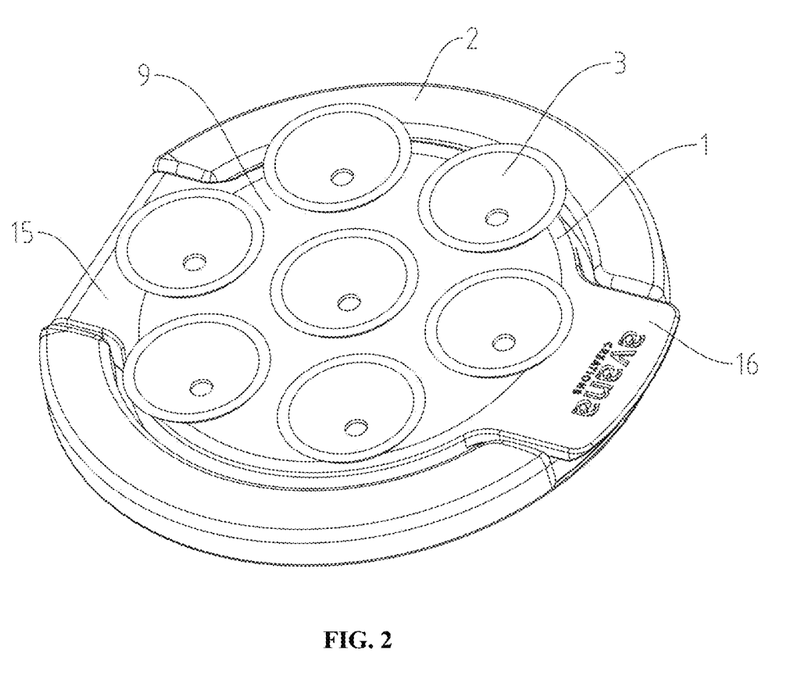
FIG. 2 is another three-dimensional diagram of a suction cup holder of the present disclosure.
Figure 3:
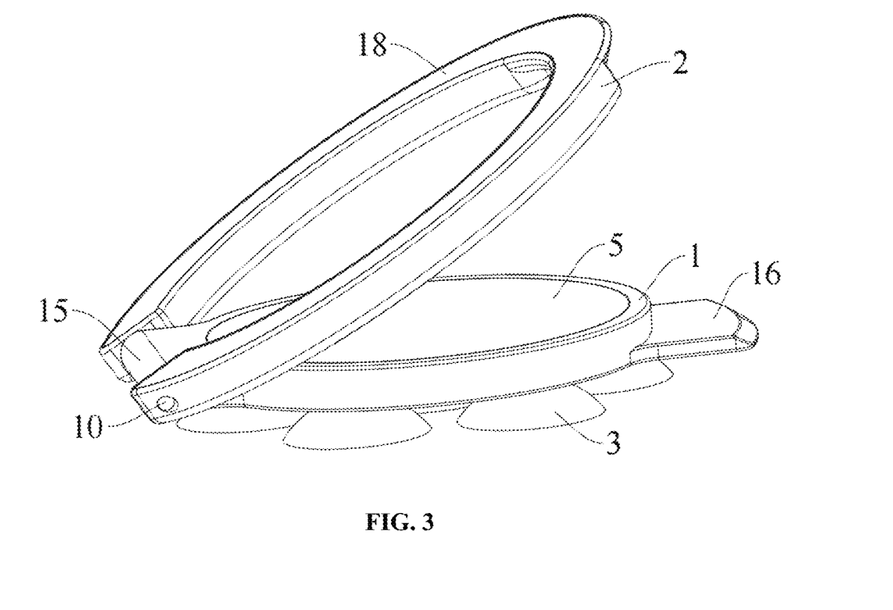
FIG. 3 is a diagram of a use state of a suction cup holder of the present disclosure.
Figure 4:
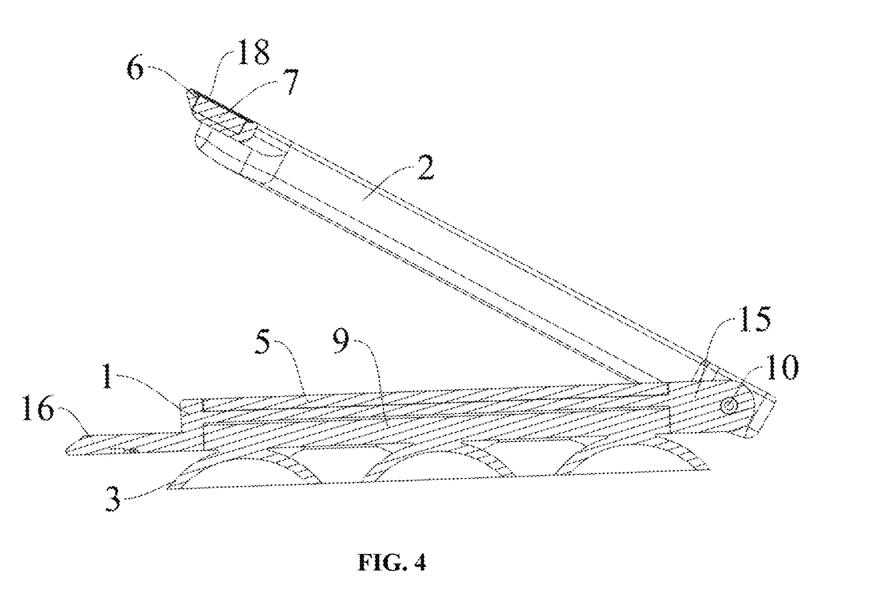
FIG. 4 is a sectional view of a suction cup holder of the present disclosure in the state of FIG. 3.
Figure 5:
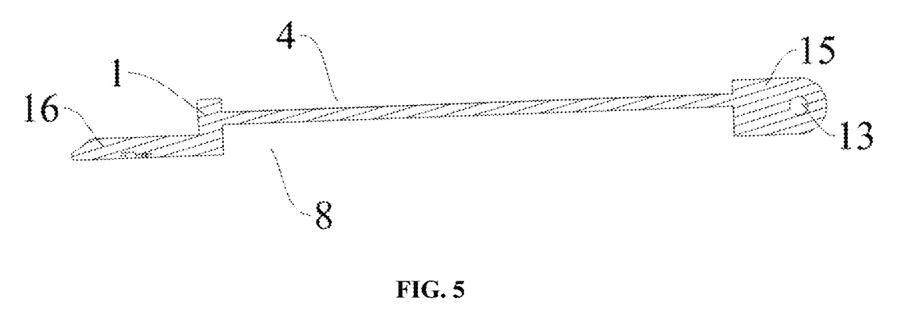
FIG. 5 is cross-sectional view of a fixed seat in the present disclosure.
Figure 6:
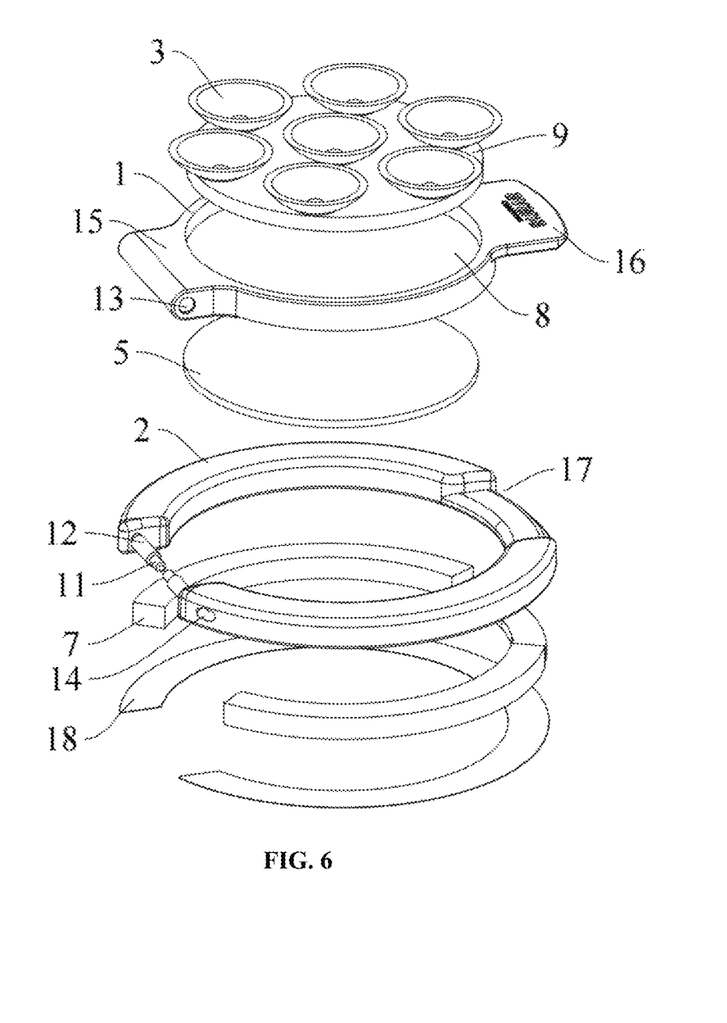
FIG. 6 is a structural exploded diagram of a suction cup holder of the present disclosure.

As shown in FIG. 1 to FIG. 6, the present disclosure provides a suction cup holder, including a fixed seat 1 and a magnetic suction seat 2; several suction cups 3 are fixed on a bottom surface of the fixed seat 1; the fixed seat 1 is circular; a first circular groove 4 is provided on a top surface of the fixed seat 1; a mirror 5 is fixed in the first circular groove 4; the magnetic suction seat 2 is annular; the magnetic suction seat 2 and the fixed seat 1 are rotatably connected; the magnetic suction seat 2 sleeves the fixed seat 1; an annular groove 6 is provided on the magnetic suction seat 2; an opening of the annular groove 6 faces away from the suction cups 3; and an annular magnet 7 is fixed in the annular groove 6.

The fixed seat 1 and the magnetic suction seat 2 can rotate each other. This can be that the fixed seat 1 rotates relative to the magnetic suction seat 2, or that the magnetic suction seat 2 rotates relative to the fixed seat 1.

When the suction cup holder is not used, the annular magnetic suction seat 2 sleeves an outer ring of the fixed seat 1. The overall thickness and volume of the suction cup holder are small, so that it is convenient to store and carry the suction cup holder. The magnetic suction seat 2 rotating relative to the fixed seat 1 is taken as an example. To use the suction cup holder, the plurality of suction cups 3 are sucked on a smooth plane, and the position of the fixed seat 1 is limited. At this time, the magnetic suction seat 2 is rotated to gradually move away from the fixed seat 1 and form an angle with the fixed seat 1. A mobile phone and other devices are sucked on the magnetic suction seat 2 by the annular magnet 7, and finally a rotation angle of the magnetic suction seat 2 is adjusted according to an actual need. An angle of supporting of the suction cup holder can be adjusted, so that the suction cup holder has a wider range of applications.

A mirror surface of the mirror 5 faces the top surface of the fixed seat 1. The mirror 5 adds a mirror function to the suction cup holder, and the mirror 5 just fills the first circular groove 4 according to its thickness.

A second circular groove 8 is provided on the bottom surface of the fixed seat 1; the plurality of suction cups 3 are fixed on a same circular silica gel seat 9; and the silica gel seat 9 is fixed in the second circular groove 8. Through the arrangement, the stability of the suction cups 3 on the fixed seat 1 is improved, and the silica gel seat 9 will not protrude out of the fixed seat 1, making it more beautiful. Meanwhile, the overall thickness of the fixed seat 1 is roughly the same as that of the magnetic suction seat 2. Therefore, when the magnetic suction seat 2 sleeves the fixed seat 1, the magnetic suction seat 2 and the fixed seat 1 are integrated into a whole, seen from the appearance.

The suction cups 3 and the silica gel seat 9 are of integrated structures, both of which are supported by a silica gel material. One of the suction cups 3 is arranged in a center of the silica gel seat 9, and the remaining suction cups 3 are annularly arranged along the silica gel seat 9.

The suction cup holder further includes a rotating shaft 10; a shaft hole 13 is provided on the fixed seat 1; a mounting hole 14 is provided on the magnetic suction seat 2; the rotating shaft 10 is arranged in the shaft hole 13; two ends of the rotating shaft 10 extend out of the shaft hole 13 and are inserted into the mounting hole 14; the rotating shaft 10 is fixed in the shaft hole 13 and rotates in the mounting hole 14, or the rotating shaft 10 is fixed in the mounting hole 14 and rotates in the shaft hole 13.

The rotating shaft 10 includes two flower pins 11; the two flower pins 11 are respectively inserted into two ends of the shaft hole 13 and extend out of the two ends of the shaft hole 13; portions of the flower pins 11 inserted into the shaft hole 13 are sleeved with rubber tube sleeves 12; the rubber tube sleeves 12 are pressed between the flower pins 11 and hole walls of the shaft hole 13 to limit the positions of the flower pins 11 in the shaft hole 13, so that the flower pins 11 are fixed in the shaft hole 13, and the flower pins 11 are then fixed on the fixed seat 1; and portions of the flower pins 11 extending out of the shaft hole 13 are rotatably arranged in the mounting hole 14. Through the arrangement, the rotating shaft 10 is fixed in the shaft hole 13 and can rotate in the mounting hole 14, achieving the relative rotation between the fixed seat 1 and the magnetic suction seat 2.

The fixed seat 1 extends to form a rotating portion 15; the rotating portion 15 and the fixed seat 1 are integrally formed; the shaft hole 13 is provided on the rotating portion 15; the magnetic suction seat 2 is an opened annular shape; and the rotating portion 15 is arranged at an opening position of the magnetic suction seat 2.

The fixed seat 1 extends to form a toggle piece 16; the toggle piece 16 and the fixed seat 1 are integrally formed; and a groove 17 configured to accommodate the toggle piece 16 is provided on the magnetic suction seat 2. When the magnetic suction seat 2 sleeves the fixed seat 1, the toggle piece 16 is arranged at the position of the groove 17 and extends out of the groove 17. When the toggle piece 16 is pulled, it is easy to achieve the relative rotation between the fixed seat 1 and the magnetic suction seat 2. Meanwhile, the toggle piece 16, the fixed seat 1, and the magnetic suction seat 2 are all made of zinc alloy materials. The toggle piece 16 itself has certain hardness, so the toggle piece 16 can be used as a bottle opener for canned drink and another beverage.

An annular decorative sheet 18 is fixed on the magnetic suction seat 2, and the decorative sheet 18 is arranged at an opening position of the annular groove 6 and covers the annular magnet 7. The decorative sheet 18 may be mylar, which is neater and more beautiful.

In the present disclosure, the magnetic suction seat 2 sleeves an outer ring of the fixed seat 1, so that the suction cup holder has a small volume and is convenient to store and carry. Meanwhile, the magnetic suction seat 2 and the fixed seat 1 can rotate each other, so that an angle between two fixed positions of the suction cup holder is adjustable, and the range of applications is wide.

The above describes the preferred embodiments of the present disclosure and is not intended to limit the present disclosure. Any modification, equivalent replacement, and improvement made within the spirit and scope of the present disclosure shall fall within the protection scope of the present disclosure.

What is claimed is:

1. A suction cup holder, comprising a fixed seat (1) and a magnetic suction seat (2), wherein several suction cups (3) are fixed on a bottom surface of the fixed seat (1); the fixed seat (1) is circular; a first circular groove (4) is provided on a top surface of the fixed seat (1); a mirror (5) is fixed in the first circular groove (4); the magnetic suction seat (2) is annular; the magnetic suction seat (2) and the fixed seat (1) are rotatably connected; the magnetic suction seat (2) sleeves the fixed seat (1); an annular groove (6) is provided on the magnetic suction seat (2); an opening of the annular groove (6) faces away from the suction cups (3); and an annular magnet (7) is fixed in the annular groove (6).

2. The suction cup holder according to claim 1, wherein a second circular groove (8) is provided on the bottom surface of the fixed seat (1); the plurality of suction cups (3) are fixed on a same circular silica gel seat (9); and the silica gel seat (9) is fixed in the second circular groove (8).

3. The suction cup holder according to claim 2, wherein one of the suction cups (3) is arranged in a center of the silica gel seat (9), and the remaining suction cups (3) are annularly arranged along the silica gel seat (9).

4. The suction cup holder according to claim 1, further comprising a rotating shaft (10), wherein a shaft hole (13) is provided on the fixed seat (1); a mounting hole (14) is provided on the magnetic suction seat (2); the rotating shaft (10) is arranged in the shaft hole (13); two ends of the rotating shaft (10) extend out of the shaft hole (13) and are inserted into the mounting hole (14); the rotating shaft (10) is fixed in the shaft hole (13) and rotates in the mounting hole (14), or the rotating shaft (10) is fixed in the mounting hole (14) and rotates in the shaft hole (13).

5. The suction cup holder according to claim 4, wherein the rotating shaft (10) comprises two pins (11); the two pins (11) are respectively inserted into two ends of the shaft hole (13) and extend out of the two ends of the shaft hole (13); portions of the pins (11) inserted into the shaft hole (13) are sleeved with rubber tube sleeves (12); the rubber tube sleeves (12) are pressed between the pins (11) and hole walls of the shaft hole (13); and portions of the pins (11) extending out of the shaft hole (13) are rotatably arranged in the mounting hole (14).

6. The suction cup holder according to claim 4, wherein the fixed seat (1) extends to form a rotating portion (15); the rotating portion (15) and the fixed seat (1) are integrally formed; the shaft hole (13) is provided on the rotating portion (15); the magnetic suction seat (2) is an opened annular shape; and the rotating portion (15) is arranged at an opening position of the magnetic suction seat (2).

7. The suction cup holder according to claim 1, wherein the fixed seat (1) extends to form a toggle piece (16); the toggle piece (16) and the fixed seat (1) are integrally formed; and a groove (17) configured to accommodate the toggle piece (16) is provided on the magnetic suction seat (2).

8. The suction cup holder according to claim 1, wherein an annular decorative sheet (18) is fixed on the magnetic suction seat (2), and the decorative sheet (18) is arranged at an opening position of the annular groove (6) and covers the annular magnet (7).

9. The suction cup holder according to claim 1, wherein a mirror surface of the mirror (5) faces in a same direction as the top surface of the fixed seat (1).

\* \* \* \* \*